US009694755B2

(12) United States Patent
Gawade et al.

(10) Patent No.: US 9,694,755 B2
(45) Date of Patent: Jul. 4, 2017

(54) SEAT ASSEMBLY WITH REMOVABLE CUSHION INSERT

(71) Applicant: GM GLOBAL TECHNOLOGY OPERATIONS LLC, Detroit, MI (US)

(72) Inventors: Tushar Rajaram Gawade, Dhule (IN); Babu Govardhan V, Bengaluru (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/870,927

(22) Filed: Sep. 30, 2015

(65) Prior Publication Data
US 2016/0144792 A1 May 26, 2016

(30) Foreign Application Priority Data

Nov. 26, 2014 (IN) .......................... 1240/KOL/2014
Mar. 13, 2015 (IN) ............................. 274/KOL/2015

(51) Int. Cl.
| | | |
|---|---|---|
| *B60R 7/04* | (2006.01) | |
| *B60N 2/01* | (2006.01) | |
| *B60N 2/02* | (2006.01) | |
| *B60N 2/22* | (2006.01) | |
| *B60N 2/34* | (2006.01) | |
| *B60N 2/70* | (2006.01) | |

(52) U.S. Cl.
CPC ................ *B60R 7/043* (2013.01); *B60N 2/01* (2013.01); *B60N 2/0284* (2013.01); *B60N 2/22* (2013.01); *B60N 2/34* (2013.01); *B60N 2/345* (2013.01); *B60N 2/70* (2013.01); *B60N 2205/30* (2013.01)

(58) Field of Classification Search
CPC ...... B60N 2/02; B60N 2/0284; B60N 2/3038; B60N 2/304; B60N 2/3045; B60N 2/305; B60N 2/3063; B60N 2/3065; B60N 2/3081; B60N 2/3086; B60N 2/32; B60N 2002/0204; B60N 2002/0216; B60N 2/01; B60N 2/34; B60N 2/22; B60N 2/345; B60N 2/70; B60N 2205/30; B60R 7/043
USPC .......................................................... 296/64
See application file for complete search history.

(56) References Cited

U.S. PATENT DOCUMENTS

| | | | | |
|---|---|---|---|---|
| 4,065,174 | A * | 12/1977 | Yokohama ............... | B60N 2/32 296/69 |
| 4,191,417 | A * | 3/1980 | Ferrara ................ | B60N 2/3013 296/65.05 |
| 5,260,684 | A * | 11/1993 | Metzmaker ........... | B60N 2/002 340/425.5 |
| 5,282,666 | A * | 2/1994 | Demick ............... | B60N 2/3081 297/237 |
| 5,660,437 | A * | 8/1997 | Bauer .................. | B60N 2/3065 248/157 |
| 5,997,083 | A * | 12/1999 | Ono ....................... | B60N 2/309 297/236 |
| 6,386,629 | B1 * | 5/2002 | Severinski ........... | B60N 2/3011 297/113 |
| 6,419,313 | B1 * | 7/2002 | Newman ................. | B60N 2/70 296/37.15 |
| 7,137,663 | B2 * | 11/2006 | Tsujibayashi ...... | B60N 2/01583 296/65.03 |
| 7,600,811 | B2 * | 10/2009 | Park ..................... | B60N 3/002 296/37.15 |

(Continued)

*Primary Examiner* — Gregory Blankenship
(74) *Attorney, Agent, or Firm* — Quinn IP Law

(57) ABSTRACT

A seat assembly includes a support and a seat cushion defining a recess. The seat cushion is disposed on the support. The seat assembly further includes a cushion insert removably disposed in the recess and a fastener assembly removably coupling the cushion insert to the support such that the cushion insert is removable from the recess.

16 Claims, 4 Drawing Sheets

(56) References Cited

U.S. PATENT DOCUMENTS

| | | | | |
|---|---|---|---|---|
| 8,596,714 B2* | 12/2013 | Whitman | ................ | B60R 7/043 |
| | | | | 224/275 |
| 2002/0033623 A1* | 3/2002 | Sunohara | ............. | B60N 2/3011 |
| | | | | 297/331 |
| 2004/0051360 A1* | 3/2004 | Iliescu | .................... | B60N 2/305 |
| | | | | 297/331 |
| 2004/0056500 A1* | 3/2004 | Kayumi | .................... | B60N 2/01 |
| | | | | 296/37.15 |
| 2004/0155494 A1* | 8/2004 | Mizuno | .................. | B60R 7/043 |
| | | | | 297/188.09 |
| 2004/0160080 A1* | 8/2004 | Shibata | .................... | B60N 2/01 |
| | | | | 296/64 |
| 2007/0216186 A1* | 9/2007 | Sumida | ................ | B60N 2/4613 |
| | | | | 296/64 |
| 2008/0001425 A1* | 1/2008 | Castro | ...................... | B60N 2/06 |
| | | | | 296/65.16 |
| 2008/0088164 A1* | 4/2008 | Ahlqvist | ................ | B60N 2/309 |
| | | | | 297/311 |
| 2010/0090510 A1* | 4/2010 | Kyogoku | ............. | B60N 2/3038 |
| | | | | 297/256.1 |
| 2010/0102585 A1* | 4/2010 | Kato | .................. | B60N 2/01508 |
| | | | | 296/24.34 |
| 2011/0127794 A1* | 6/2011 | Lindsay | ................... | B60N 2/12 |
| | | | | 296/65.05 |
| 2011/0233951 A1* | 9/2011 | Zekavica | ............. | B60N 2/3013 |
| | | | | 296/24.34 |
| 2015/0028634 A1* | 1/2015 | Scherello | ............. | B60N 2/4802 |
| | | | | 297/163 |
| 2016/0144792 A1* | 5/2016 | Gawade | .................. | B60R 7/043 |
| | | | | 296/64 |

* cited by examiner

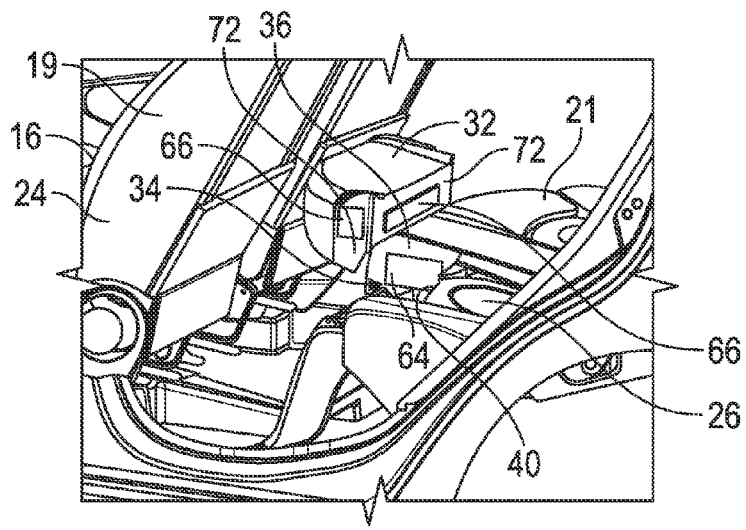
FIG. 7
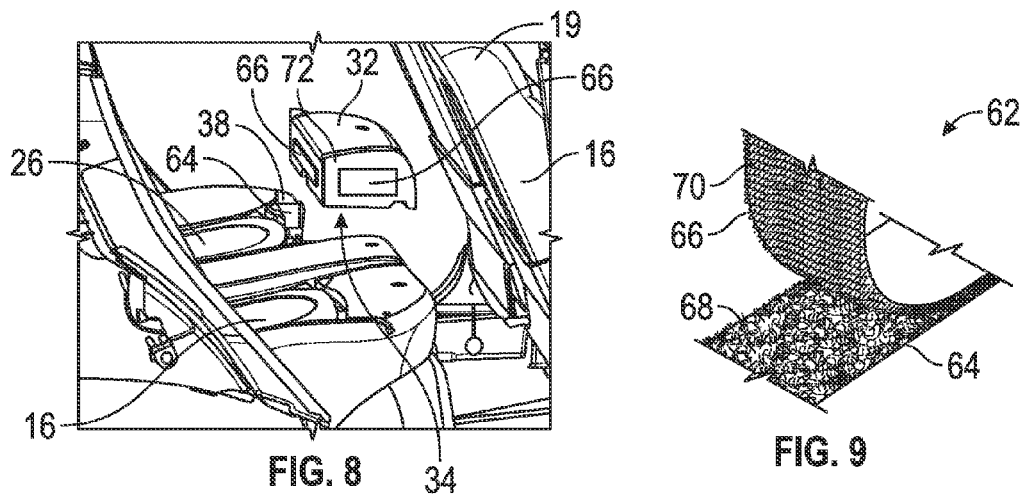
FIG. 8
FIG. 9
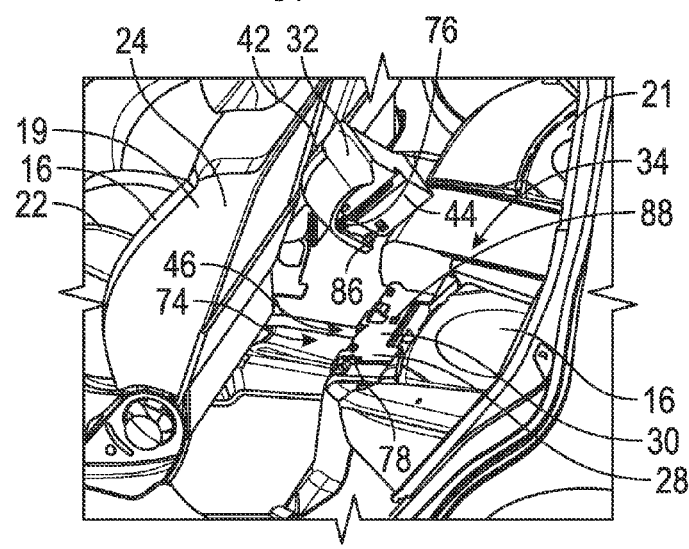
FIG. 10

US 9,694,755 B2

SEAT ASSEMBLY WITH REMOVABLE CUSHION INSERT

CROSS-REFERENCE TO RELATED APPLICATIONS

This application claims the benefit of Indian Patent Application No. 274/KOL/2015, filed on Mar. 13, 2015, which claims priority to Indian Provisional Application No. 1240/KOL/2014, filed Nov. 26, 2014, each of which is hereby incorporated by reference in their entirety.

TECHNICAL FIELD

The present disclosure relates to a seat assembly having a removable cushion insert.

BACKGROUND

Vehicles, such as cars, include a passenger compartment suitable to accommodate a driver and passengers. The passenger compartment includes seats to allow the driver and the passengers to sit inside the vehicle. For example, the vehicle may include front seats and rear seats. The driver usually sits in one of the front seats, and the passengers can sit in the rear seats and at least one of the front seats.

SUMMARY

The present disclosure describes a seat assembly with a removable cushion insert. The cushion insert is removably disposed in a recess of the seat assembly. When the cushion insert is removed from the seat assembly, the unoccupied recess can at least partially accommodate the fully reclined seatback of a seat in front of the recess. With the fully reclined seatback, a vehicle occupant can comfortably sleep on the seat.

In an embodiment, the seat assembly includes a support and a seat cushion defining a recess. The seat cushion is disposed on the support. The seat assembly further includes a cushion insert removably disposed in the recess and a fastener assembly removably coupling the cushion insert to the support such that the cushion insert is removable from the recess. The present disclosure also discloses vehicles including the seat assembly described above.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 7 is a schematic, perspective, left-hand side view of a passenger compartment of the vehicle shown in FIG. 1, wherein a seat assembly includes a removable cushion insert having hook-and-loop fasteners in accordance with another embodiment of the present disclosure;

FIG. 8 is a schematic, perspective, right-hand side view of the passenger compartment in FIG. 7;

FIG. 9 is a schematic, perspective, view of one of the hook-and-loop fasteners shown in FIGS. 7 and 8;

FIG. 10 is a schematic, perspective view of a passenger compartment of the vehicle shown in FIG. 1, wherein a seat assembly includes a removable cushion insert having a snap-fit fastener assembly removably coupling the cushion insert to a support;

DETAILED DESCRIPTION

Figure 1:
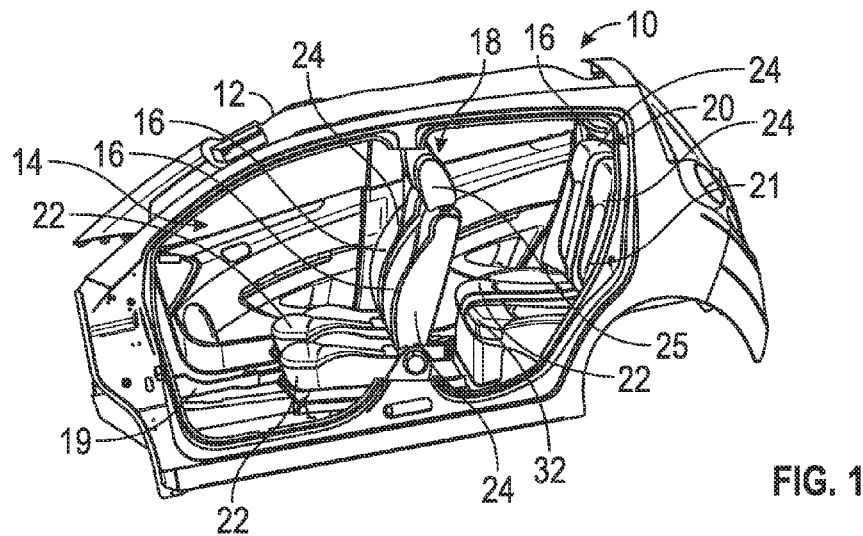
FIG. 1 is a schematic, perspective view of a portion of a vehicle.

Referring to the drawings, wherein like reference numbers correspond to like or similar components throughout the several figures, and beginning with FIG. 1, a vehicle 10 may be a car or a truck and includes a vehicle body 12. Although the drawings illustrate the vehicle 10 as a car, it is contemplated that the vehicle 10 may be non-automotive vehicles, such as boats and airplanes. The vehicle body 12 defines a passenger compartment 14 configured, shaped, and sized to accommodate a driver and at least one passenger. The vehicle 10 includes seats 16 inside the passenger compartment 14. The seats 16 may be arranged in rows. For instance, in the depicted embodiment, the vehicle 10 includes a first or front row 18 and a second or rear row 20. The seats 16 in the first row 18 are referred to as first or front seats 19, and the seats 16 in the second row 20 are referred to as second or rear seats 21. It is contemplated, however, that the vehicle 10 may include more or fewer rows of seats 16.

Figure 6:
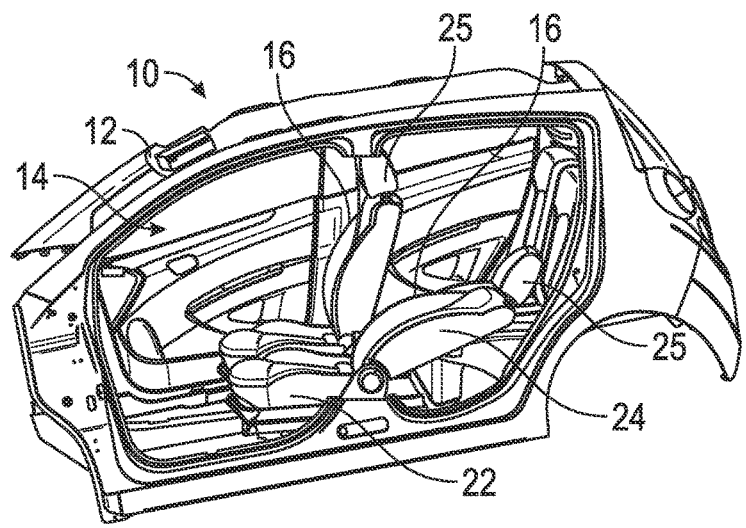
FIG. 6 is a schematic, perspective view of the vehicle shown in FIG. 1, depicting the seatback of a front seat partially disposed in the recess of the seat assembly.
Figure 11:
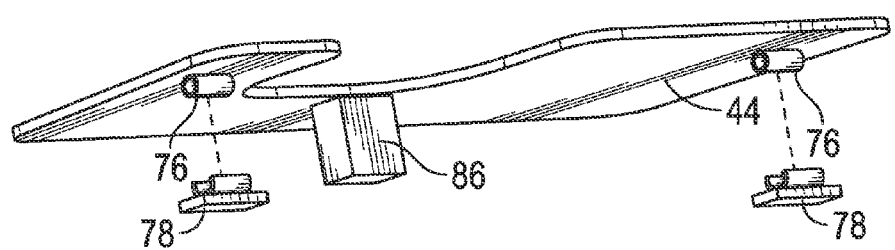
FIG. 11 is a schematic, perspective view of an insert base of the cushion insert shown in FIG. 10 and the female snap-fit components of the support.
Figure 12:
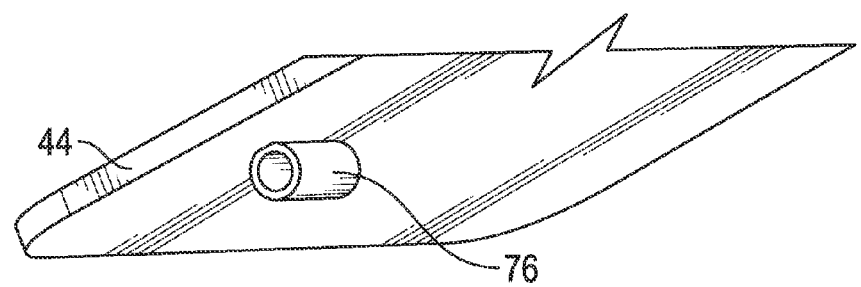
FIG. 12 is a schematic, perspective, fragmentary view of the insert base of the cushion insert shown in FIG. 11.
Figure 13:
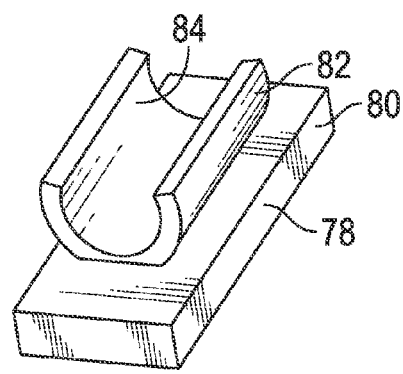
FIG. 13 is a schematic, perspective view of the female snap-fit component shown in FIG. 11.
Figure 14:
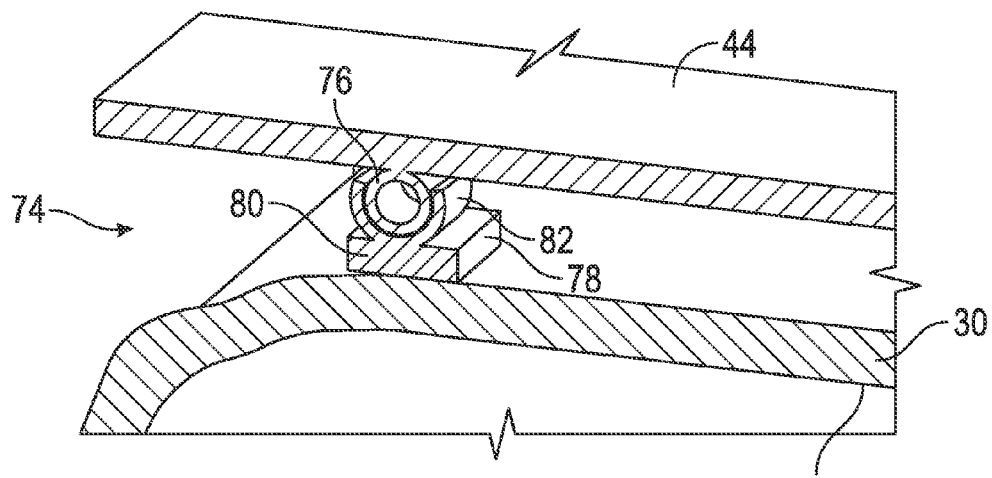
FIG. 14 is a schematic, perspective, fragmentary sectional view of the male snap-fit component coupled to the female snap-fit component shown in FIG. 11.

Each seat 16 includes a seat base 22 and a seatback 24 coupled to the seat base 22. In at least one of the seats 16, the seatback 24 is movably coupled to the seat base 22. In particular, in the seats 16 of the first row 18, each seatback 24 is rotatably coupled to the seat base 22. In the depicted embodiment, the seatback 24 can pivot relative to the seat base 22. Therefore, each seatback 24 can recline relative to the seat base 22 between a first seatback position (FIG. 1) and a second seatback position (FIG. 6).

With reference to FIGS. 2-5, each seat base 22 may include a seat cushion 26 and a support 28 sustaining the seat cushion 26. The seat cushion 26 is wholly or partly made of a compressible material in order to comfortably support a human body. For example, the seat cushion 26 may be wholly or partly made of foam. The support 28 is wholly or partly made of a substantially rigid material (i.e., non-compressible material) in order to support the seat cushion 26. For instance, the support 28 may be wholly or partly made of a rigid material, such as metal. In the second seats 21, the support 28 includes a rear floor panel 30 directly supporting the seat cushion 26. The rear floor panel 30 is wholly or partly formed of sheet metal.

The support 28 (and therefore the rear floor panel 30) also holds a removable cushion insert 32. The cushion insert 32 is removably disposed in a recess 34 partially defined by the seat cushion 26. The recess 34 is defined by the seat cushion 26 and the support 28. The seat cushion 26 has a first inner cushion wall 36, a second inner cushion wall 38 opposite the first inner cushion wall 36, and a third inner cushion wall 40 interconnecting the first inner cushion wall 36 and the second inner cushion wall 38. The first inner cushion wall 36, the second inner cushion wall 38, and the third inner cushion wall 40 of the seat cushion 26 partially define the recess 34. The rear floor panel 30 of the support 28 also partially defines the recess 34. Accordingly, the first inner cushion wall 36, the second inner cushion wall 38, the third inner cushion wall 40, and the rear floor panel 30 define the entire recess 34.

The cushion insert 32 is configured, shaped, and sized to be removably disposed in the recess 34 and includes a cushion portion 42 and an insert base 44 coupled the cushion portion 42. The cushion portion 42 is wholly or partly made of a compressible material, such as foam, in order to comfortably support a human body. The insert base 44 is wholly or partly made of a substantially rigid material, such as metal, in order to support the cushion portion 42. The cushion insert 32 and the seat 16 are collectively referred to as a seat assembly 33.

The vehicle 10 includes a fastener assembly 46 removably coupling the cushion insert 32 to the support 28 and/or the seat cushion 26. In the embodiment depicted in FIGS. 3-5, the fastener assembly 46 includes a hinge assembly 48 movably coupling the cushion insert 32 to the support 28. The hinge assembly 48 includes a substantially rigid rod 50 movably coupled between the rear floor panel 30 of the support 28 and the insert base 44 of the cushion insert 32. In addition to the rod 50, the hinge assembly 48 includes a first hinge 52a, a second hinge 52b, and a third hinge 52c each rotatably coupled to the rod 50. It is envisioned that the hinge assembly 48 may include more or fewer hinges. Regardless of the number of hinges, each of the first hinge 52a, second hinge 52b, and third hinge 52c includes a rod receiving channel 54 configured, shaped, and sized to receive the rod 50, thereby allowing the rod 50 to rotate within each of the rod receiving channels 54. The first hinge 52a is directly coupled to the insert base 44 of the cushion insert 32, and the second hinge 52b and the third hinge 52c are directly coupled to the rear floor panel 30 of the support 28. The rod 50 includes a first rod portion 56 directly coupled to the first hinge 52a, a second rod portion 58 directly coupled to the second hinge 52b, and a third rod portion 60 directly coupled to the third hinge 52c. The first rod portion 56 directly interconnects the second rod portion 58 and the third rod portion 60.

Figure 2:
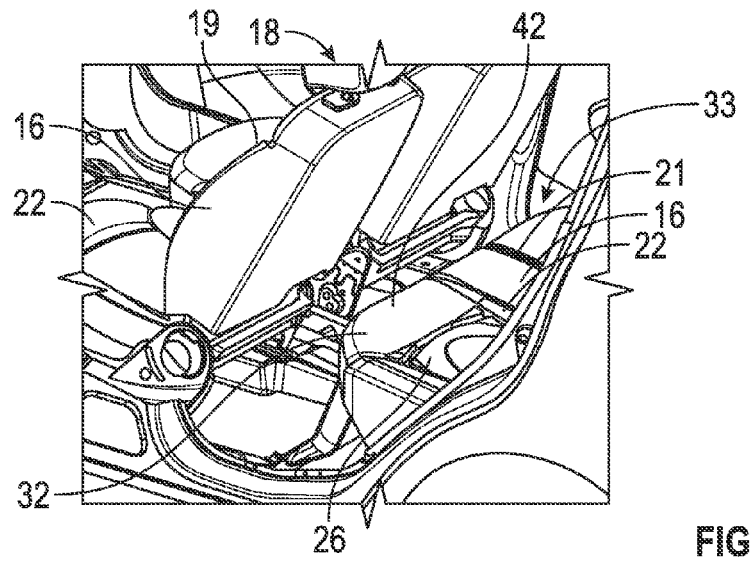
FIG. 2 is a schematic, perspective, fragmentary view of a passenger compartment of the vehicle shown in FIG. 1, wherein a seat assembly includes a seat cushion and a removable cushion insert disposed in a recess of the seat assembly.
Figure 3:
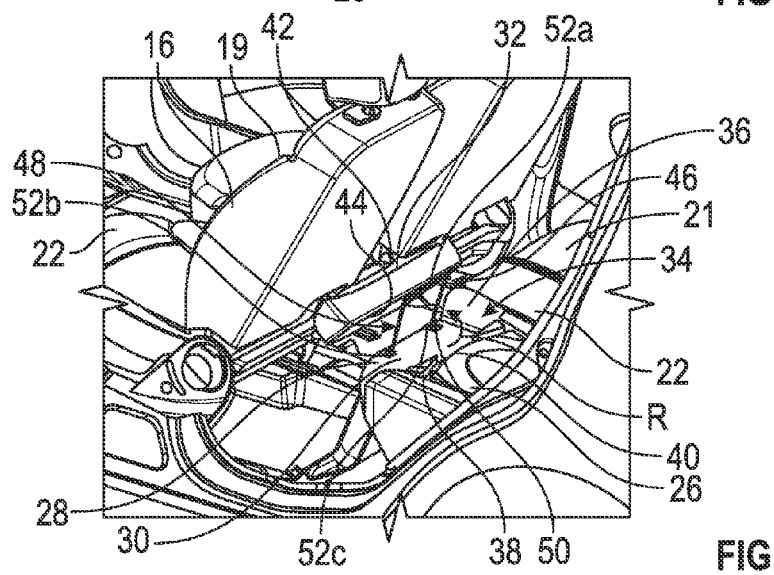
FIG. 3 is a schematic, perspective, fragmentary view of a passenger compartment of the vehicle shown in FIG. 1, depicting a hinge assembly movably coupling the cushion insert to a support.
Figure 4:
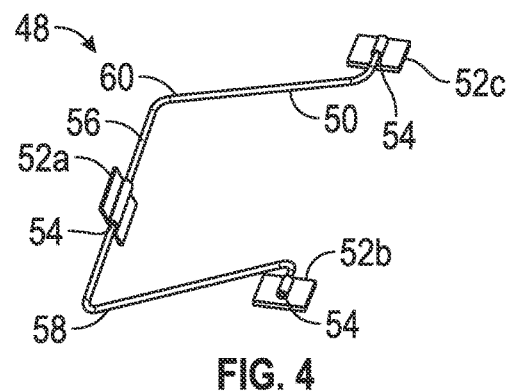
FIG. 4 is a schematic, perspective view of the hinge assembly shown in FIG. 3.
Figure 5:
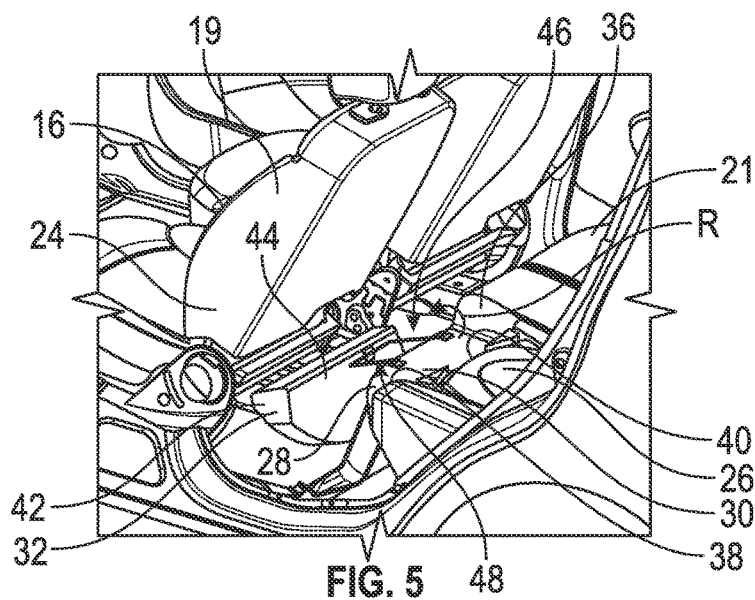
FIG. 5 is a schematic, perspective, fragmentary view of the passenger compartment of the vehicle shown in FIG. 1, depicting the cushion insert completely removed from the seat cushion.

Initially, the cushion insert 32 may be in a first insert position relative to the support 28. In the first insert position, the cushion insert 32 is at least partially disposed in the recess 34 as shown in FIG. 2. Then, the cushion insert 32 can be pulled away from the recess 32 as shown in FIG. 3. While the cushion insert 32 moves away from the support 28, the rod 50 rotates relative to the support 28 in the rotational direction indicated by arrow R. The cushion insert 32 can be continually moved away from the support 28 until the cushion insert 32 reaches a second insert position as shown in FIG. 5. In the second insert position, the cushion insert 32 is completely outside the recess 34. Once the cushion insert 32 is in the second insert position (FIG. 5), the seatback 24 of the seat 16 that is directly in front of the recess 34 can be reclined relative to the seat base 22 from the first seatback position (FIG. 1) to the second seatback position (FIG. 6). In the second seatback position, the seatback 24 is at least partially disposed in the recess 34. Due to the inclination of the seatback 24 relative to the seat base 22, the vehicle occupant can comfortably sleep on the seat 16 when the seatback 24 is at least partially disposed in the recess 34. Before moving the seatback 24 to the second seatback position (FIG. 6), the headrest 25 of the seat 16 (if adjustable) can be moved to its lowermost position. If the position of the headrest 25 cannot be adjusted relative to the seatback 24, the size of the recess 34 can be enlarged to allow the seatback 24 to fully recline. The front seat 19 can also be moved toward or away from the recess 34 to accommodate the seatback 24 in the recess 34.

With reference to FIGS. 7-9, the fastener assembly 46 includes at least one hook-and-loop fastener 62 (FIG. 9) removably coupling the cushion insert 32 to the support 28 and/or the seat cushion 26 instead of (or in addition to) the hinge assembly 48. In the depicted embodiment, the vehicle 10 includes a plurality of hook-and-loop fasteners 62. Each hook-and-loop fastener 62 includes a first fabric strip 64 and a second fabric strip 66 configured, shaped, and sized to be removably coupled to the first fabric strip 64.

The first fabric strip 64 includes a plurality of loops 68, and the second fabric strip 66 includes a plurality of hooks 70. When the first fabric strip 64 is pressed against the second fabric strip 66, the loops 68 are removably coupled to the hooks 70. In the depicted embodiment, the first fabric strips 64 are coupled to the first inner cushion wall 36, the second inner cushion wall 38, and the third inner cushion wall 40 of the seat cushion 26, whereas the second fabric strips 66 are coupled to the inner insert walls 72 of the cushion insert 32. However, it is contemplated that the second fabric strips 66 may be alternatively coupled to the first inner cushion wall 36, the second inner cushion wall 38, and the third inner cushion wall 40 of the seat cushion 26, and the first fabric strips 64 may be coupled to the inner insert walls 72 of the cushion insert 32. Regardless, when the cushion insert 32 is disposed in the recess 34, the loops 68 are removably coupled to the hooks 70 in order to removably couple the cushion insert 32 to the seat cushion 26. The cushion insert 32 can be pulled away from the seat cushion 26 in order to decouple the cushion insert 32 from the seat cushion 26.

With reference to FIGS. 10-14, the fastener assembly 46 includes a snap-fit fastener assembly 74 in lieu of (or in addition to) the hook-and-loop fastener 62 and/or the hinge assembly 48. The snap-fit fastener assembly 74 includes at least one male snap-fit component 76 and at least one female snap-fit component 78 configured, shaped, and sized to securely (and removably) receive the male snap-fit component 76. In the depicted embodiment, the snap-fit fastener assembly 74 includes two male snap-fit components 76 directly protruding from the insert base 44, and each male snap-fit component 76 may be substantially cylindrical to allow it to compress while it is being inserted into the female snap-fit component 78. It is contemplated, however, that the snap-fit fastener assembly 74 may include more or fewer male snap-fit components 76. Irrespective of the quantity, each male snap-fit component 76 is made of a rigid but compressible material, such as a polymer.

In the depicted embodiment, the snap-fit fastener assembly 74 includes two female snap-fit components 78 directly coupled to the rear floor panel 30 of the support 28. However, the snap-fit fastener assembly 74 may include more or fewer female snap-fit components 78. Each female snap-fit component 78 is made of a substantially rigid material, such as a rigid polymer, and includes a snap-fit base 80, which is directly coupled to the support 28, and a female connector 82 configured, shaped, and sized to securely receive the male snap-fit component 76. The female connector 82 may have a substantially U-shape and defines an open concave cavity 84 (FIG. 13) configured, shaped, and sized to receive the male snap-fit component 76. Accordingly, each male snap-fit component 76 can be pressed into the female snap-fit component 78 until the male snap-fit component 76 is secured in the open concave cavity 84, thereby coupling the cushion insert 32 to the support 28. Although the depicted embodiment illustrates the male snap-fit components 76 coupled to the cushion insert 32 and the female snap-fit components 78 coupled to the support 28, the male snap-fit components 76 may be alternatively coupled to the support 28, and the female snap-fit components 78 may be coupled to the cushion insert 32.

In addition to the male snap-fit component 76 and the female snap-fit component 78, the cushion insert 32 includes a locating pin 86 protruding directly from the insert base 44, and a locating hole 88 extending into the rear floor panel 30 of the support 28. The locating hole 88 is configured, shaped, and, sized to receive the locating pin 86 in order to appropriately position the cushion insert 32 relative to the support 28. It is contemplated that the locating hole 88 may alternatively extend into the insert base 44 of the cushion insert 32, and the locating pin 86 may protrude from the support 28.

To couple the cushion insert 32 to the support 28, each male snap-fit component 76 is inserted in the open concave cavity 84 of the female snap-fit component 78. While being inserted into the open concave cavity 84 of the female snap-fit component 78, the male snap-fit component 76 or female connector 82 may deform until it is securely positioned in the open concave cavity 84. To facilitate locating the cushion insert 32 relative to the support 28, the locating pin 86 is inserted into the locating hole 88. Once the male snap-fit components 76 are secured to the female snap-fit components 78, the cushion insert 32 is removably coupled to the support 28. To remove the cushion insert 32 from the recess 34, the cushion insert 32 can be pulled away from the support 28. The seatback 24 of the seat 16 directly in front of the recess 34 can then be reclined relative to the seat base 22 from the first seatback position (FIG. 1) to the second seatback position (FIG. 6). In the second seatback position, the seatback 24 is at least partially disposed in the recess 34.

While the best modes for carrying out the teachings have been described in detail, those familiar with the art to which this disclosure relates will recognize various alternative designs and embodiments for practicing the teachings within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle, comprising:
    a vehicle body defining a passenger compartment;
    a first seat disposed in the passenger compartment, wherein the first seat includes a seat base and a seatback movably coupled to the seat base such that the seatback is movable relative to the seat base between a first seatback position and a second seatback position;
    a second seat disposed in the passenger compartment, wherein the second seat includes:
        a support disposed in the passenger compartment;
        a seat cushion defining a recess and disposed on the support;
        a cushion insert removably disposed in the recess;
        a rod movably coupled between the cushion insert and the support; and
    wherein, in the second seatback position, the seatback is at least partially received in the recess when the cushion insert is removed from the recess.

2. The vehicle of claim 1, further comprising at least one hook-and-loop fastener removably coupling the cushion insert to the seat cushion.

3. The vehicle of claim 2, wherein the seat cushion includes at least one inner cushion wall defining the recess, and the at least one hook-and-loop fastener includes a first fabric strip coupled to the at least one inner cushion wall and a second fabric strip coupled to the cushion insert.

4. The vehicle of claim 3, wherein the first fabric strip includes a plurality of loops.

5. The vehicle of claim 4, wherein the second fabric strip includes a plurality of hooks configured to be coupled to the loops.

6. The vehicle of claim 1, further comprising a first hinge directly coupled to the cushion insert and the rod, and a second hinge directly coupled to the support and the rod.

7. The vehicle of claim 6, further comprising a third hinge directly coupled to the support and the rod.

8. The vehicle of claim 1, further comprising a snap-fit fastener assembly removably coupling the cushion insert to the support.

9. The vehicle of claim 8, wherein the snap-fit fastener assembly includes a male snap-fit component and a female snap-fit component sized to receive the male snap-fit component.

10. The vehicle of claim 9, wherein the cushion insert includes a cushion portion and an insert base coupled to the cushion portion, the male snap-fit component is coupled to the insert base of the cushion insert, and the female snap-fit component is coupled to the support.

11. The vehicle of claim 10, further comprising a locating pin coupled to the insert base and a locating hole extending into the support, wherein the locating hole is configured to receive the locating pin.

12. A seat assembly, comprising:
    a support;
    a seat cushion defining a recess, wherein the seat cushion is disposed on the support;
    a cushion insert removably disposed in the recess;
    a fastener assembly removably coupling the cushion insert to the support such that the cushion insert is removable from the recess, wherein the fastener assembly includes a snap-fit fastener assembly removably coupling the cushion insert to the support, the snap-fit fastener assembly includes a male snap-fit component and a female snap-fit component sized to receive the male snap-fit component, the cushion insert includes a cushion portion and an insert base coupled to the cushion portion, the male snap-fit component is coupled to the insert base of the cushion insert, and the female snap-fit component is coupled to the support; and a locating pin coupled to the insert base and a locating hole extending into the support, wherein the locating hole is configured to receive the locating pin.

13. The seat assembly of claim 12, wherein the fastener assembly includes at least one hook-and-loop fastener removably coupling the cushion insert to the seat cushion so as to maintain the cushion insert in the recess.

14. The seat assembly of claim 13, wherein the seat cushion defines a plurality of inner cushion walls, the inner cushion walls defining the recess, the at least one hook-and-loop fastener includes a first fabric strip coupled to one of the inner cushion walls defining the recess and a second fabric strip coupled to the cushion insert, the first fabric strip includes a plurality of loops, and the second fabric strip includes a plurality of hooks configured to be coupled to the loops.

15. The seat assembly of claim 12, wherein the fastener assembly includes a rod movably coupled between the cushion insert and the support.

16. The seat assembly of claim 15, further comprising a first hinge directly coupled to the cushion insert and the rod, and a second hinge directly coupled to the support and the rod.

* * * * *